US008040398B2

(12) United States Patent  (10) Patent No.: US 8,040,398 B2
Yoshida  (45) Date of Patent: Oct. 18, 2011

(54) IMAGING APPARATUS AND METHOD FOR DISPLAYING ZOOM INFORMATION

(75) Inventor: Tohru Yoshida, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 806 days.

(21) Appl. No.: 11/893,279

(22) Filed: Aug. 15, 2007

(65) Prior Publication Data

US 2008/0055429 A1  Mar. 6, 2008

(30) Foreign Application Priority Data

Sep. 4, 2006 (JP) ................................ 2006-238409

(51) Int. Cl.
*H04N 5/262* (2006.01)
*H04N 5/222* (2006.01)

(52) U.S. Cl. ............ 348/240.1; 348/333.02; 348/333.11

(58) Field of Classification Search .... 348/240.1–240.3, 348/333.01, 333.02, 333.04, 333.11
See application file for complete search history.

(56) References Cited

U.S. PATENT DOCUMENTS

| 6,685,631 | B2 * | 2/2004 | Minami .................. 600/168 |
| 7,573,514 | B2 * | 8/2009 | Pasquarette et al. ....... 348/240.2 |
| 7,688,364 | B2 * | 3/2010 | LeGall et al. ............ 348/240.99 |
| 2004/0174444 | A1 * | 9/2004 | Ishii .......................... 348/240.1 |
| 2008/0309795 | A1 * | 12/2008 | Mitsuhashi et al. ..... 348/231.99 |

FOREIGN PATENT DOCUMENTS

| JP | 2002-51253 A | 2/2002 |
| JP | 2006-211434 A | 8/2006 |
| JP | 2008-042847 A | 2/2008 |
| WO | WO 2006064696 A1 * | 6/2006 |

OTHER PUBLICATIONS

Japanese Office Action dated Nov. 4, 2008 and partial English translation thereof issued in counterpart Japanese application No. 2006-238409.

* cited by examiner

*Primary Examiner* — Timothy J Henn
(74) *Attorney, Agent, or Firm* — Holtz, Holtz, Goodman & Chick, P.C.

(57) ABSTRACT

An imaging apparatus is provided, which includes an image capturing unit, an adjusting unit and a display unit. The adjusting unit adjusts a clipped area for an image captured by the image capturing unit on photographing mode. The display unit displays a first number of pixels of the clipped area adjusted by the adjusting unit.

6 Claims, 14 Drawing Sheets

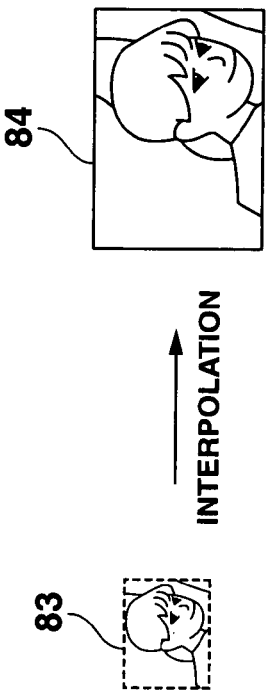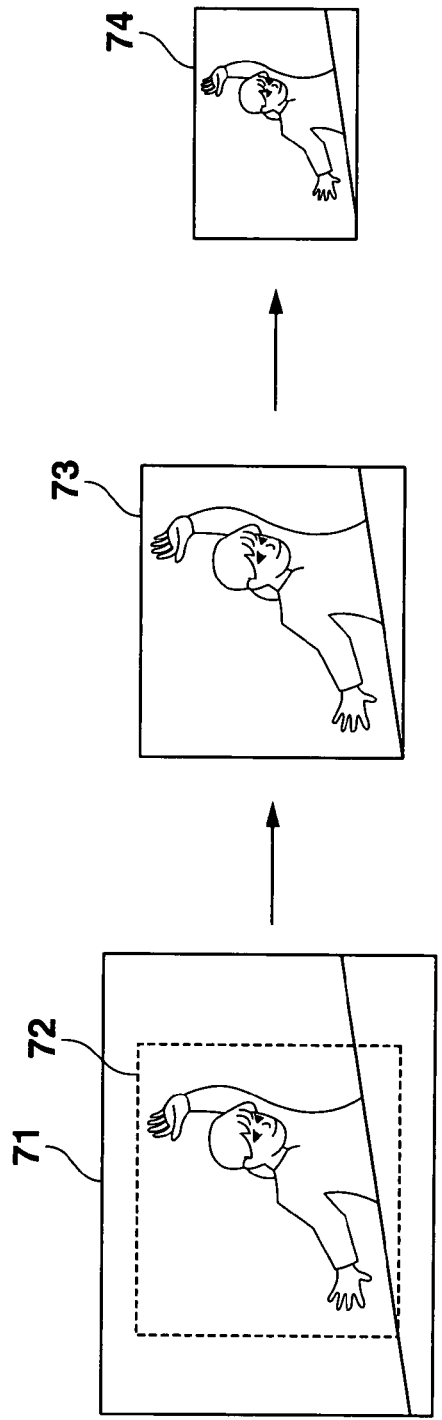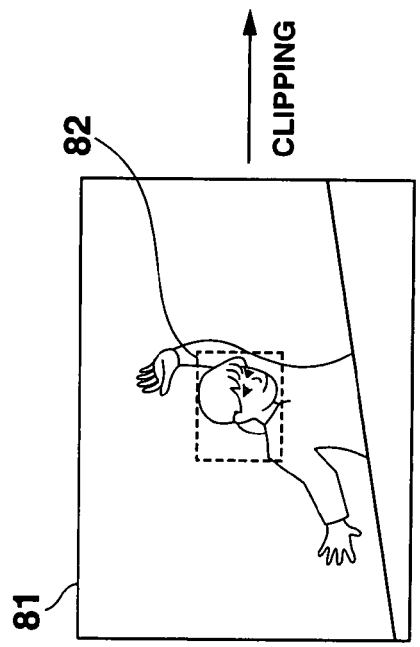

IMAGING APPARATUS AND METHOD FOR DISPLAYING ZOOM INFORMATION

CROSS-REFERENCE TO RELATED APPLICATIONS

This application is based on and claims the benefit of priority from Japanese Patent Application No. 2006-238409, filed on 4 Sep. 2006, the content of which is incorporated herein by reference.

BACKGROUND OF THE INVENTION

1. Field of the Invention

The present invention relates to techniques enabling a display of zoom information during zoom operation.

2. Related Art

There are imaging devices such as digital cameras having optical and digital zooming. Optical zooming is what lenses of a digital camera can perform for changing a focal length and a picture angle by changing the positions of some of the lenses. On the other hand, in digital zooming, the digital camera clips some portion of pixel areas captured by an image sensor and electronically enlarges the portion for zoom effect.

Optical zooming controls positions of predetermined lenses so as to change a focal length, allowing the control of a zoom magnification. Digital zooming, on the other hand, clips a captured image data in a predetermined size so as to adjust a picture angle. In addition, digital zooming performs an interpolation for insufficient pixels based on brightness data and the like of adjacent pixels, for example, such that the insufficient pixels are supplemented with to obtain a number of pixels, which is substantially equivalent with that originally acquired. In this way, digital zooming controls the zoom magnification.

In such imaging devices, a current zoom magnification is indicated by a numerical value. Alternatively, as shown in FIGS. 15A and 15B, the current zoom magnification is intuitively displayed in a visual manner with a moving block 172 in a bar graph 170 defined by an optical zoom area 171 and a digital zoom (electronic zoom) area 173.

Japanese Unexamined Patent Application Publication No. 2002-51253 discloses a technique for switching with a common zooming member between optical and digital zooming in electronic imaging devices.

As described above, the zoom information has been conventionally controlled to be displayed in the form of a numerical value or bar. However, general imaging devices, which are widely used mainly for mobile applications, have a display resolution which is lower than that of an image sensor. Accordingly, a user may have been unaware of the degradation of an image when taking a picture while looking at a display of an imaging device.

In addition, a boundary 174 between the optical zoom area 171 and digital zoom area 173, as shown in FIGS. 15A and 15B, does not necessarily indicate a position at which the degradation of an image starts. Furthermore, since the boundary 174 has been conventionally fixed, it has not succeeded in helping the user to capture a desirable image.

SUMMARY OF THE INVENTION

In an aspect of the present invention, an imaging apparatus includes an image capturing unit, an adjusting unit and a display unit. The adjusting unit adjusts a clipped area for an image captured by the image capturing unit on photographing mode. The display unit displays a first number of pixels of the clipped area adjusted by the adjusting unit.

In another aspect of the present invention, an imaging apparatus includes an image capturing unit, an imaging lens and a moving unit. The moving unit moves the imaging lens. The adjusting unit adjusts a clipped area for an image captured by the image capturing unit on photographing mode. The position setting unit sets for the moving unit a position of the imaging lens at a time of the adjusting unit starting to adjust the clipped area.

In still another aspect of the present invention, an imaging apparatus includes an image capturing unit, an adjusting unit, a first output unit, a memory unit, a second output unit and a display unit. The adjusting unit adjusts a clipped area for an image captured by the image capturing unit on photographing mode. The first output unit outputs a zoom magnification corresponding to the clipped area. The memory unit stores information about degradation of the image quality, which occurs at a time of recording due to the adjustment performed by the adjusting unit, in correlation with the clipped area. The second output unit outputs the information about degradation corresponding to the clipped area read out from the memory unit. The display unit displays the zoom magnification outputted by the first output unit and the information about degradation outputted by the second output unit.

In yet another aspect of the present invention, a method is provided for displaying zoom information of an imaging apparatus having a display unit. The method includes the steps of: (a) adjusting a clipped area for a captured image; and (b) displaying a number of pixels of the clipped area adjusted in step (a).

In a further aspect of the present invention, a method is provided for determining a position of an imaging lens of an imaging apparatus that has a moving unit for moving the imaging lens. The method includes the steps of: (a) adjusting a clipped area for a captured image; and (b) outputting to the moving unit a position of the imaging lens at a time of starting to adjust the clipped area in step (a).

In a still further aspect of the present invention, a method is provided for controlling a display unit of an imaging apparatus having a memory unit that stores information about degradation of an image at a time of recording in correlation with a clipped area. The method includes the steps of: (a) adjusting a clipped area for a captured image; (b) outputting a zoom magnification corresponding to the clipped area adjusted in step (a); (c) outputting the information about degradation corresponding to the clipped area read out from the memory unit; and (d) displaying the zoom magnification outputted in step (b) and the information about degradation outputted in step (c).

Since the present invention displays one of the number of clipped pixels and the number of output pixels along with the zoom information, the user can timely obtain the information about the resolution of an image to be degraded due to digital zooming during taking a picture. Moreover, the imaging apparatus and the method for displaying zoom information allow freely setting the start position of digital zooming between the telephoto end and the wide end of optical zooming. This provides the user with wider selection for a photographing condition to acquire a desired picture angle.

BRIEF DESCRIPTION OF THE DRAWINGS

FIGS. 7A to 7C are explanatory diagrams of an example illustrating a sub-sampling of pixels for a clipped image area;

FIGS. 8A to 8C are explanatory diagrams of an example illustrating an interpolation of pixels for a clipped image area;

DETAILED DESCRIPTION OF THE INVENTION

Figure 1A:
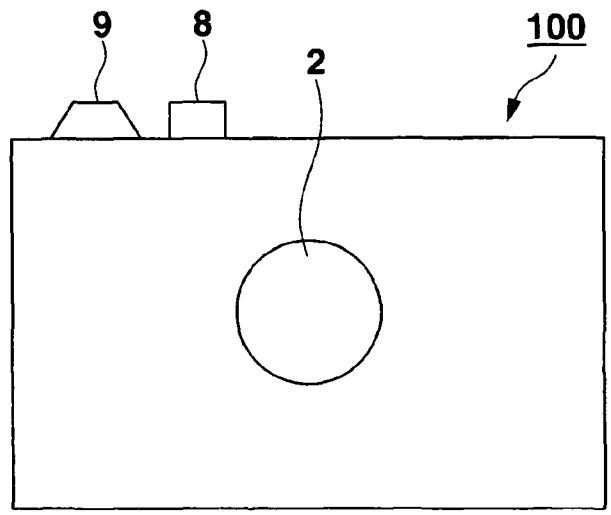
FIGS. 1A and 1B are diagrams each showing an exterior view of a digital camera as an example of a common imaging apparatus for each embodiment of the present invention.
Figure 1B:
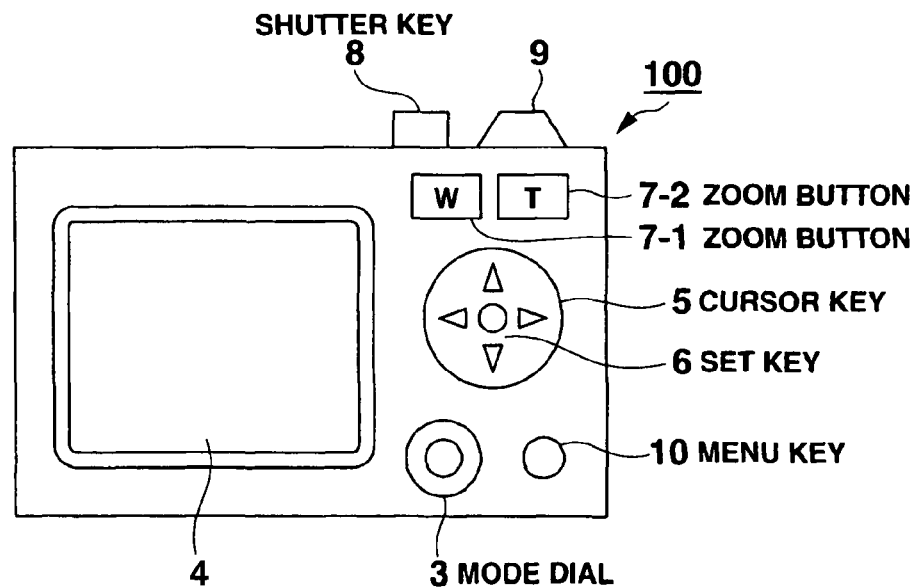

FIGS. 1A and 1B are diagrams each illustrating an exterior view of a digital camera as an example of a common imaging apparatus for each embodiment of the present invention. FIG. 1A shows a front view, and FIG. 1B a back view. As shown in FIG. 1A, a digital camera 100 has a lens tube 2 in front which allows imaging lenses (a group of lenses) to move back and forth according to zoom magnifications during optical zooming. As shown in FIG. 1B, keys such as a mode dial 3, cursor key 5, SET key 6, zoom button 7 ("W" button 7-1 and "T" button 7-2), and menu key 10, and Liquid Crystal Display (LCD) 4 as a display unit are disposed on the back of the digital camera 100. Moreover, a shutter key 8 and a power button 9 are disposed on the top surface. A USB terminal (not shown) is disposed on a side surface for use of connecting the digital camera 100 to external devices such as personal computers (hereinafter referred to as "computers"), or modems via USB cables.

The digital camera 100 has image taking modes such as a normal mode of taking a still image, mode of taking a macro image, mode of taking consecutive images, high-speed mode of taking an image, mode of taking a moving image, and high-speed mode of taking consecutive images, and reproducing modes such as a mode of reproducing a still image, mode of reproducing a moving image, and mode of reproducing consecutive images.

Figure 2:
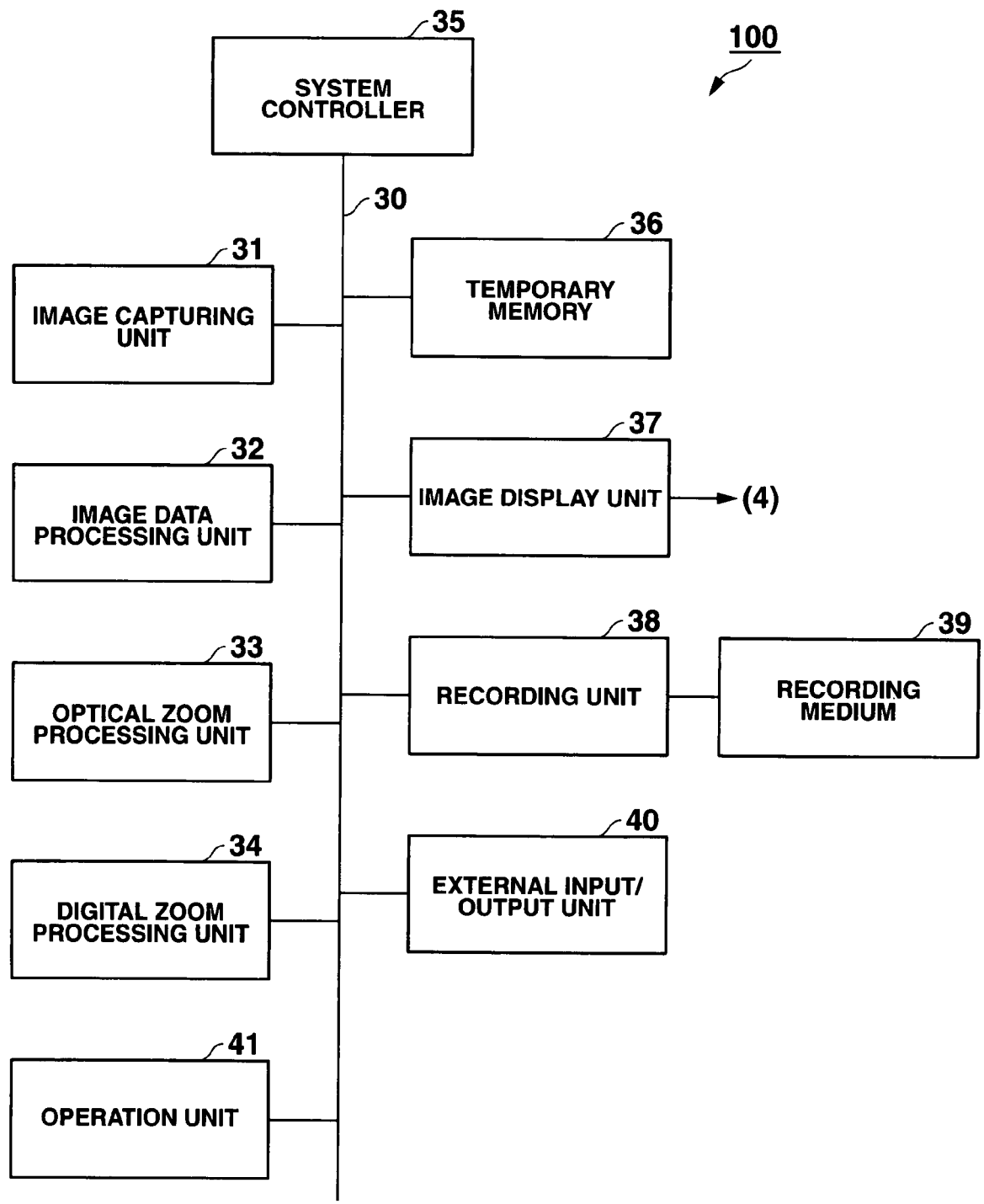
FIG. 2 is a block diagram showing an exemplary electrical configuration of the digital camera as an example of common imaging apparatus for each embodiment of the present invention.

FIG. 2 is a block diagram showing an exemplary electrical configuration of the digital camera 100 as an example of a common imaging apparatus for each embodiment of the present invention. The digital camera 100 includes an image capturing unit 31, an image data processing unit 32, an optical zoom processing unit 33, a digital zoom processing unit 34, a system controller 35, a temporary memory 36, an image display unit 37, a recording unit 38, an external input/output unit 40, and an operation unit 41.

In addition, the digital camera 100 has functions such as automatic focusing, image taking, optical zooming, and digital zooming. Image taking includes a mode of taking a still image and a mode of taking a moving image. Optical zooming controls a position of a lens according to a zoom magnification. Digital zooming clips a certain size of image data so as to obtain a desirable picture angle, and performs an interpolation for supplementing insufficient pixels caused by a zoom magnification with brightness data and the like of adjacent pixels.

Figure 3:
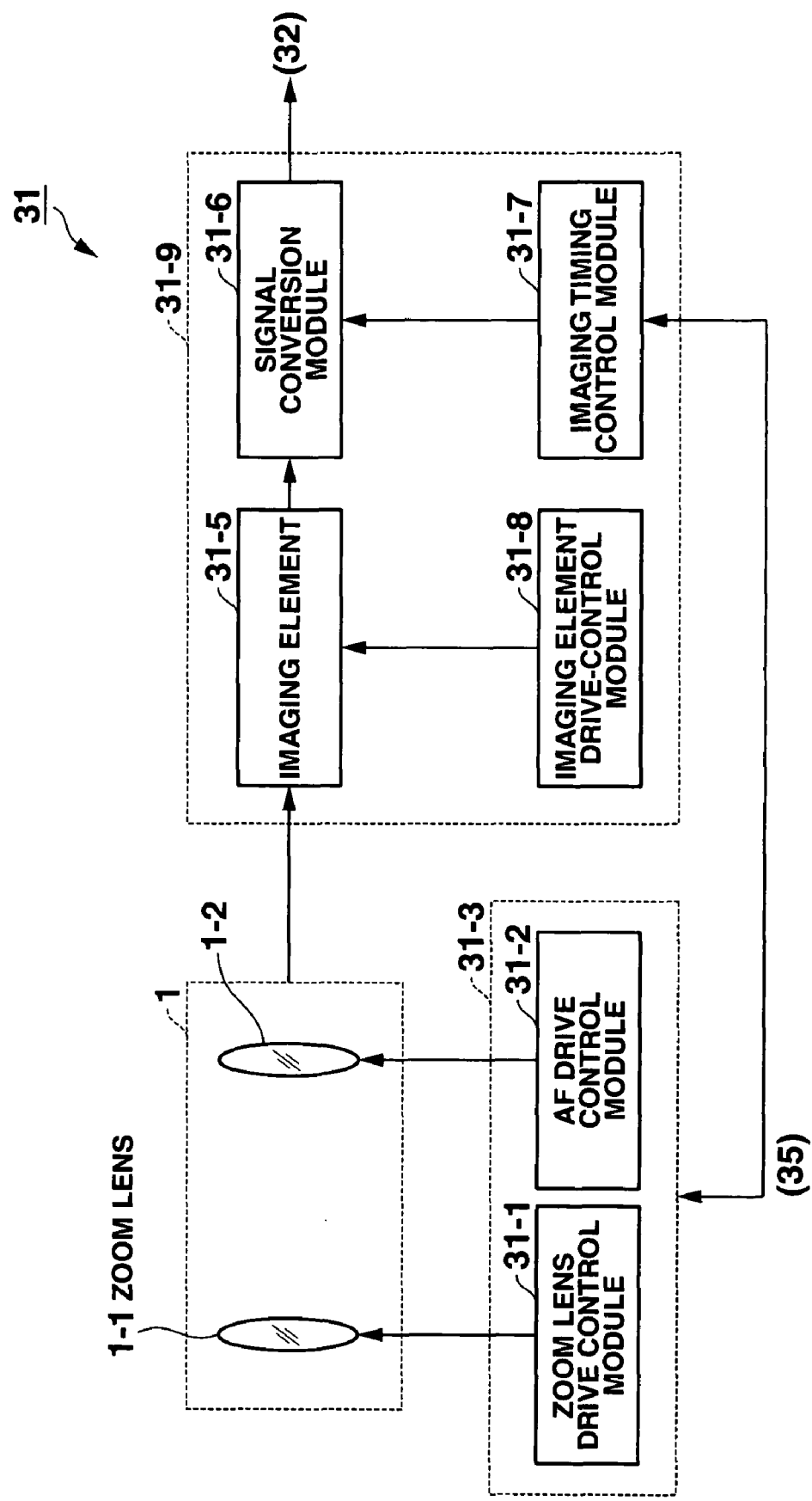
FIG. 3 is a block diagram showing an example of an image capturing unit.

As shown in FIG. 3, the image capturing unit 31 has a lens drive system 31-3 and an imaging system 31-9 in addition to a lens group 1. The lens drive system 31-3 includes a zoom lens drive-control module 31-1 that performs optical zooming by moving a zoom lens 1-1 during the basic mode of capturing an image. Also, the lens drive system 31-3 includes an AF drive control module 31-2 that controls focusing by moving a focus lens 1-2. The imaging system 31-9 includes an imaging element 31-5, a signal conversion module 31-6, an imaging timing control module 31-7, and an imaging element drive-control module 31-8. An optical image of a photogenic subject entering the imaging element 31-5 that is placed backward along the optical axis of the lens group 1 is photoelectrically converted to an image signal (analog). The signal conversion module 31-6 performs correlated double sampling and gain adjustment for the signal output from the imaging element 31-5, and converts the signal to a digital signal by A/D conversion. The A/D converted image signal is sent to the image data processing unit 32 at predetermined intervals. The imaging element 31-5 is a solid-state imaging apparatus such as Complementary Metal Oxide Semiconductor (CMOS), which takes a two-dimensional image of a photogenic subject, and typically takes dozens of image frames per second. However, the imaging element 31-5 is not limited to CMOS.

The image data processing unit 32 performs color processing, including image interpolation and gamma conversion, for the digital signal (image data) output from the signal conversion module 31-6 so as to generate a brightness signal Y and color-difference signals Cb and Cr in digital value. Subsequently, the image data processing unit 32 sends the signal to the temporary memory 36 constituted of DRAM, for example, by DMA transfer via a bus 30. The resulting number of pixels is generally greater than that of recorded pixels, even though it depends on the specification of the imaging element 31-5.

The optical zoom processing unit 33 sends a control signal, which moves the zoom lens (variable focal length lens) 1-1 to a wide (W) side or tele (T) side, to the zoom lens drive-control module 31-1 according to a zoom magnification determined by manipulation of the zoom button 7. Also, the optical zoom processing unit 33 acquires the positional information of the zoom lens 1-1, and sends it to the system controller 35. In the case of optical zooming, since a distance between the receiving surface of the imaging element 31-5 and the lens is changed according to the determined zoom magnification, a picture angle actually varies. Therefore, unlike digital zooming in which an enlarged display of clipped images is performed by an interpolation, the degradation of image resolution does not occur.

The digital zoom processing unit 34 adjusts a picture angle (a zoom magnification) by clipping an image area, which is in accordance with an instruction given through manipulation of the zoom button 7, from an image of one frame which is sent from the image data processing unit 32 and stored in the temporary memory 36. Subsequently, the digital zoom processing unit 34 adjusts the number of pixels associated with the image, area to be the number of output pixels determined in advance (hereafter referred to as "set number of pixels"), producing an enlarged image of the image area. Furthermore, the set number of pixels represents an image data size which is applied to recording of a captured image, for example. This indicates that a user obtains image data of the abovementioned size.

In addition, adjustment of picture angle by clipping a part of an image is performed in the following way, for example. The digital zoom processing unit 34 clips a rectangular image area from an image of one frame stored in the temporary memory 36, in accordance with an instruction given through zooming manipulation, in which the position of a pixel corresponding to the center of the receiving surface of the imaging element 31-5 is defined as an origin. The greater a digital zoom magnification is, the smaller a clipped image area is. On the other hand, the smaller a zoom magnification is, the greater a clipped image area is.

Adjustment of a number of pixels of a clipped image to meet the set number of pixels differs according to the relationship between these two numbers. For example, when the number of pixels of the clipped image is smaller than the set number of pixels, a pixel interpolation is performed with data of adjacent pixels and the like such that the number of pixels of the clipped image meets the set number of pixels. In this case, the smaller a clipped area is, the greater a number of interpolated pixels is. This indicates that the image quality obtained by a user degrades more according to enlargement performed by digital zooming. More specifically, even though the number of pixels of an output image is maintained, image resolution degrades because of degradation occurring in each image data.

A description is given of a different case where the number of pixels of the clipped image is greater than the set number of pixels even after clipping, when a small value is selected for the set number of pixels. In this case, sub-sampling is performed such that the number of pixels of the clipped image meets the set number of pixels. Even though the clipped image area is smaller, the quality of the image obtained by the user is substantially the same as originally planned until the number of pixels of the clipped image decreases to the set number of pixels. In other words, each image data does not degrade, regardless of whether or not digital zooming is performed. In addition, the sub-sampling described above includes a process having a pixel interpolation so as to obtain a predetermined number of pixels as well as a simple sub-sampling process.

The system controller 35 performs the entire control of the digital camera 100, and includes CPU or MPU (hereinafter referred to as "CPU"), a program storage memory such as a flash memory storing operation programs executed by CPU, and RAM, etc. used as a working memory. The system controller 35 reads out brightness and color-difference signals from the temporary memory 36, when the image data (brightness and color-difference signals) have been sent to the temporary memory 36 such as DRAM, etc. by DMA transfer from the image data processing unit 32. Subsequently, the system controller 35 writes the brightness and color-difference signals in a buffer memory of the image display unit 37.

The system controller 35 calls a processing program and menu data corresponding to each mode stored in the program storage memory in response to a state signal sent from the operation unit 41, and controls functions of the digital camera 100. The control includes displaying capturing image, displaying the zoom information during zoom processing in accordance with a photographing mode set by optical zooming or digital zooming, performing automatic focusing, photographing, recording and reproducing/displaying the recorded image, displaying a menu at the time of selecting functions, and display control of a screen, etc.

The temporary memory 36 including DRAM and the like provides a graphic data area during zooming as a buffer memory for displaying bar graphs, for example. Data for controlling a display of the zoom information according to the present invention can be stored temporarily in the graphic data area.

The image display unit 37 has a buffer memory for display such as VRAM, etc., a display control unit and LCD 4. The image display unit 37 periodically reads out the above brightness and color-difference signals written in the buffer memory for display under control of the system controller 35 via the display control unit. Subsequently, the image display unit 37 generates video signals based on the read-out signals, and outputs the video signals to LCD 4 described above. In addition, a portion of LCD 4 is used as a graphical display area for displaying bar graph, for example, during zooming. Data for displaying zoom information transferred from the temporary memory 36 is converted to a dot image. In this way, the zoom information is displayed in bar graph on LCD 4.

The recording unit 38 includes a data compression/extension unit and a controller, etc. The data compression/extension unit performs compression and extension of data. The controller writes data transferred from the buffer memory such as DRAM, etc. in a recording medium 39, and reads the data from the recording medium 39. The recording medium 39, which stores image data and imaging information written by the recording unit 38, includes a rewritable recording medium such as FDD, an optical disc, or a detachable memory card, etc.

The external input/output unit 40 includes an input/output interface and the like for inputting and outputting image data and programs, etc. between the digital camera 100 and an external device, which is connected to the digital camera 100 by a connecting device such as a USB cable and a communication network such as an internet.

The operation unit 41 includes keys such as a mode dial 3, cursor key 5, SET key 6, zoom button 7, shutter key 8, power button 9 and menu key 10, as shown in FIG. 1, and a key processing portion, etc. The key processing portion generates an operation signal for a manipulated key, and sends the signal to the system controller 35.

The mode dial 3 is used to select one of imaging mode, playback mode, and the like. A user can manipulate the mode dial 3 to select an imaging mode, such as a still imaging mode, macro imaging mode, continuous shooting mode, high-speed shooting mode, and dynamic imaging mode, and playback mode.

The cursor key 5 is used to select a menu, an icon, and the like displayed on LCD 4, while setting a mode and selecting a menu. A cursor follows manipulation of the cursor key 5, moving up, down, left, and right. The SET key 6 is used for selecting one of items that have been displayed according to an instruction given through the cursor key 5. In addition, the SET key 6 can be used as a confirmation key.

The zoom button 7 is used for zooming. In the case of optical zooming, the zoom lens (variable focal length lens) 1-1 moves to a wide or tele side in accordance with the manipulation of the zoom button 7, causing a change in a zoom magnification (picture angle). In the case of digital zooming, an image area in accordance with the manipulation of the zoom button 7 is clipped, and the picture angle thereof is adjusted. Subsequently, the number of pixels thereof is adjusted to meet the set number of pixels, which has been determined in advance.

The shutter key 8 performs a release operation with two-step stroke at a time of capturing an image. The system controller 35 generates a focusing signal indicating automatic focusing (AF) and automatic exposure (AE) in response to the first stroke (depressing half way) of the shutter key 8, and a signal indicating an execution of capturing an image in response to the second stroke (depressing all the way).

Figure 4:
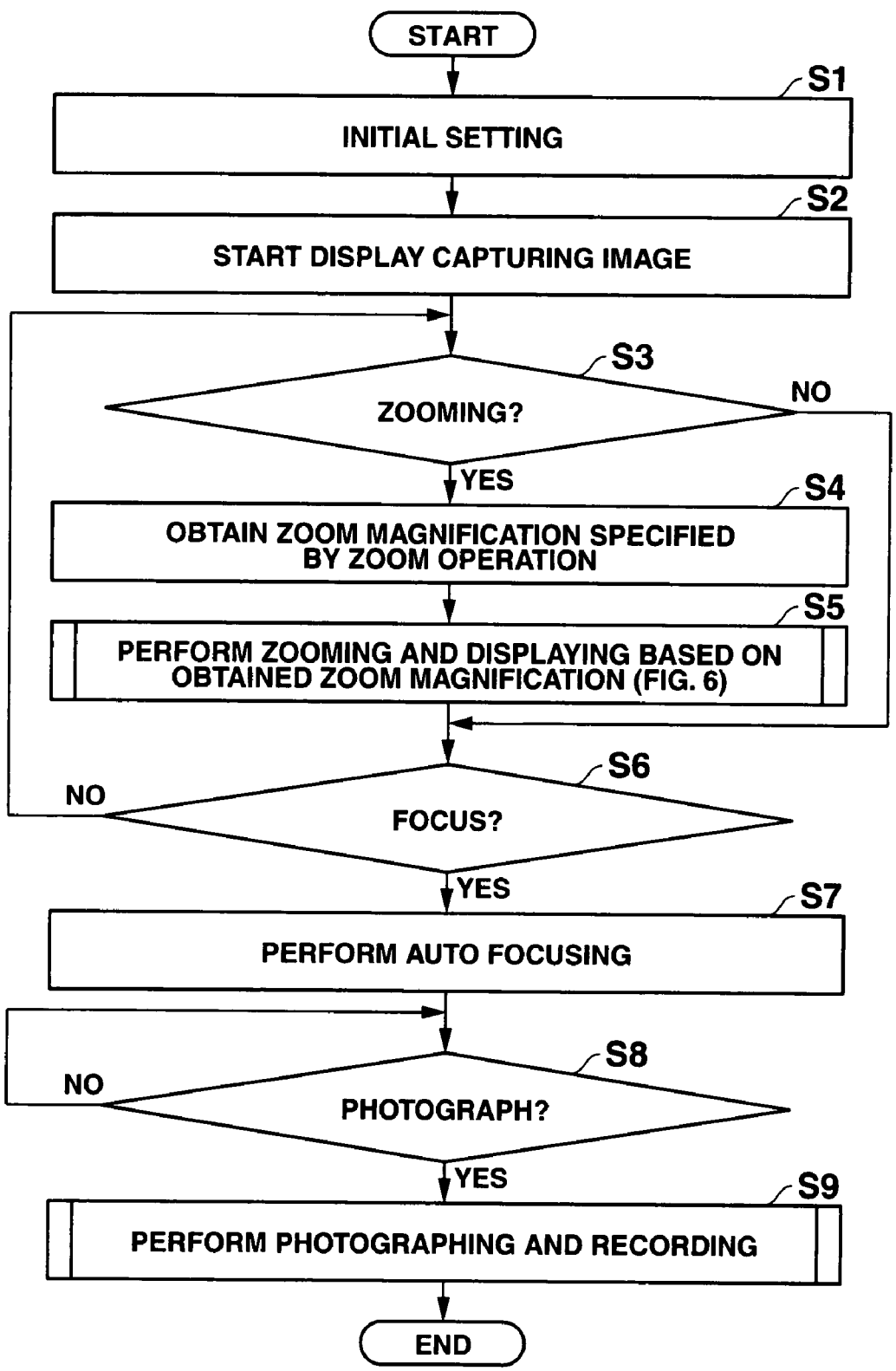
FIG. 4 is a flow chart illustrating an exemplary control action performed during photographing.

FIG. 4 is a flow chart illustrating an exemplary control performed by the system controller 35 during photographing. The process described below is basically explained with an example in which CPU of the system controller 35 operates according to the program stored beforehand in the program memory. Storing all functions in the program memory is not necessary, and part or all of the programs may be received through the network, for example. An explanation is given in the following with reference to FIGS. 1 to 4.

When the power key 9 of the digital camera 100 is turned on, various initializations are performed. At this time, a magnification (a position of the zoom lens) of optical zooming and a zoom magnification (a size of a clipped image area) of digital zooming are also initialized. In addition, when a user selects a photographing mode by manipulating the mode dial 3, the system controller 35 controls the image display unit 37 to display a selection menu, including a menu for selecting parallel zooming and a process for setting a number of output pixels (set number of pixels). When the user has selected a menu and finished various inputs, the system controller 35 establishes a configuration based on them. Furthermore, the system controller 35 automatically sets predetermined default values for items that have not been specified by the user, for example (step S1).

In addition, the user can select a function for setting a digital zoom starting point in the initial setting. When the user does not select this function, the system controller 35 sets normal zooming. In this case, the system controller 35 controls zooming such that optical zooming is performed preferentially until an optical zoom magnification reaches a predetermined maximum threshold, and digital zooming is started instead when the optical zoom magnification has reached the predetermined maximum threshold. A zoom magnification is calculated by multiplying a maximum zoom magnification of optical zooming by a digital zoom magnification. For example, if the maximum zoom magnification of optical zooming is 3 and the digital zoom magnification is 2, a zoom magnification can be obtained by 3×2=6 power.

When the user selects the function for setting a digital zoom starting point at the initial setting, the system controller 35 sets variable digital zooming. In this case, the system controller 35 controls zooming such that optical zooming is preferentially performed until the optical zoom magnification reaches a set threshold. When the optical zoom magnification has reached the set threshold, the system controller 35 starts to prioritize digital zooming from this point, even if it is possible to further increase the zoom magnification by optical zooming. A description in detail is given later.

Moreover, when the user selects a menu for setting a number of output pixels, it is possible to set an image size (number of output pixels) of the image data recorded in the recording medium 39, for example. If the user does not select this menu, the system controller 35 automatically sets a number equivalent to the number of pixels possessed by the receiving surface of the imaging element 31-5 as the number of output pixels, for example. The number of output pixels (set number of pixels), which can be set with the menu for setting a number of pixels, is smaller than the number of pixels provided on the receiving surface of the imaging element 31-5. When such a number of output pixels is set, sub-sampling is performed at a predetermined timing for the image data outputted from the imaging element 31-5 such that the number of pixels meets the number of output pixels.

Next, the system controller 35 controls the image capturing unit 31 and the image data processing unit 32 to perform automatic exposure with a focal length corresponding to the current zoom magnification. The system controller 35 sequentially obtains image data from an optical image of a photogenic subject taken through a photographing lens 1, while adjusting a white balance of the image data with the Automatic White Balance (AWB) so as to meet that of the color of the light source. Subsequently, the system controller 35 obtains image data of one frame at predetermined regular intervals, sending the image data to the temporary memory 36 by DMA transfer. The system controller 35 starts a display of capturing image on LCD 4, in which the system controller 35 sequentially rewrites a buffer for display of the image display unit 37 with the video through image data that has been produced by sub-sampling the image data stored in the temporary memory 36 (step S2). The user can freely perform zooming with the zoom button 7 while capturing images are being displayed.

The system controller 35 checks a signal from the operating unit 41. If the zoom button 7 has been manipulated, the system controller 35 advances the process to step S4, whereas if the zoom button 7 has not been manipulated, it advances the process to step S6 (step S3).

When the zoom button 7 is manipulated in step S3, the system controller 35 sequentially calculates zoom magnifications, according to a number of manipulations of the zoom button 7 relative to a predetermined position or a time period of manipulation (step S4). Known methods may be used for the calculation of the zoom magnifications.

Figure 6:
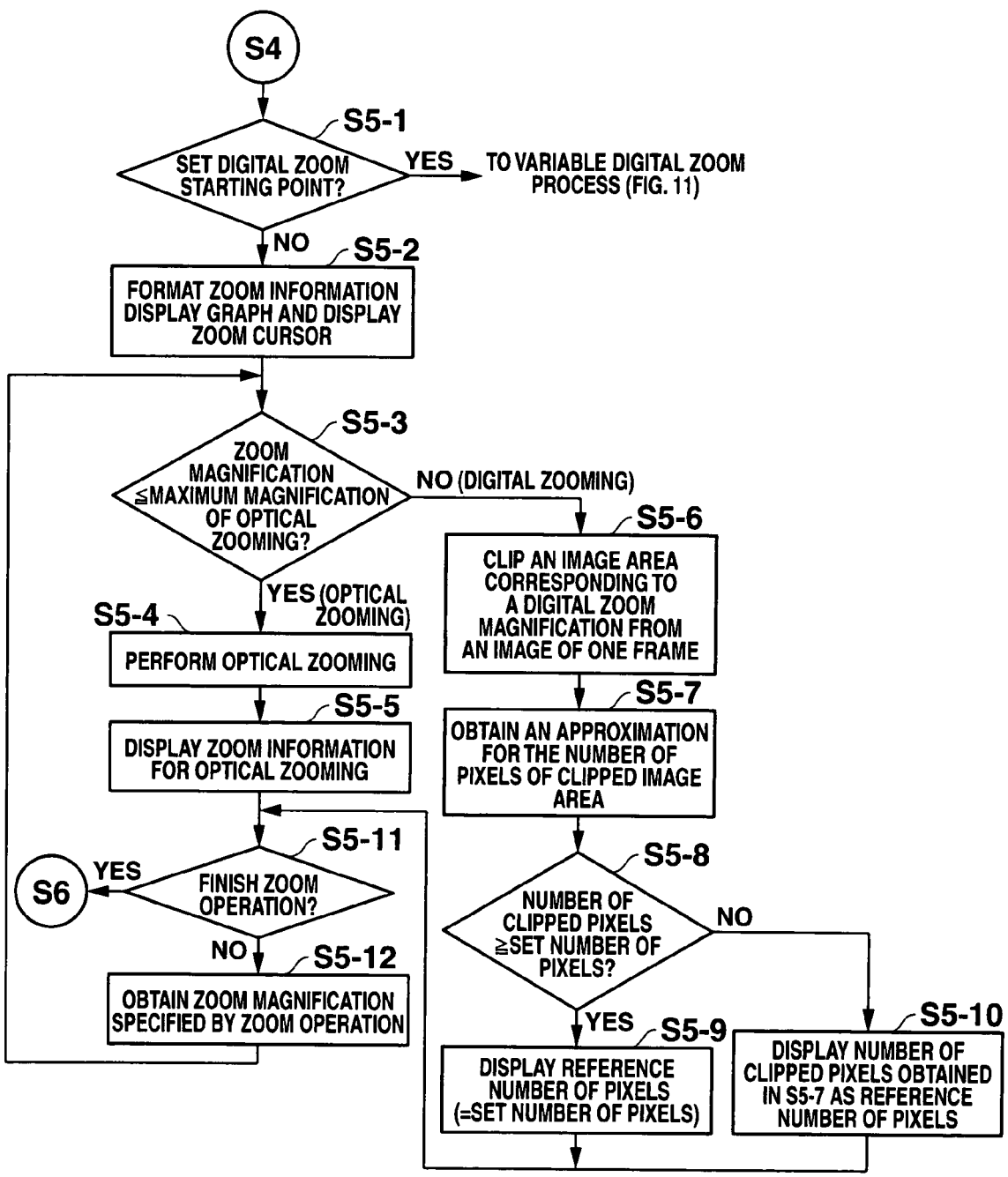
FIG. 6 is a flow chart illustrating an exemplary zooming process and control action for displaying zoom information.

Next, as shown in the flow chart of FIG. 6, the system controller 35 performs a zoom process according to the zoom magnification obtained with the zoom method (function) selected in step S1, and a process for displaying zoom information (step S5). More specifically, the system controller 35 performs the zoom process in the following manner: the system controller 35 performs optical zooming when the requested zoom magnification is less than the maximum zoom magnification of optical zooming, or digital zooming when the zoom magnification is equal to or greater than the maximum.

Figure 11:
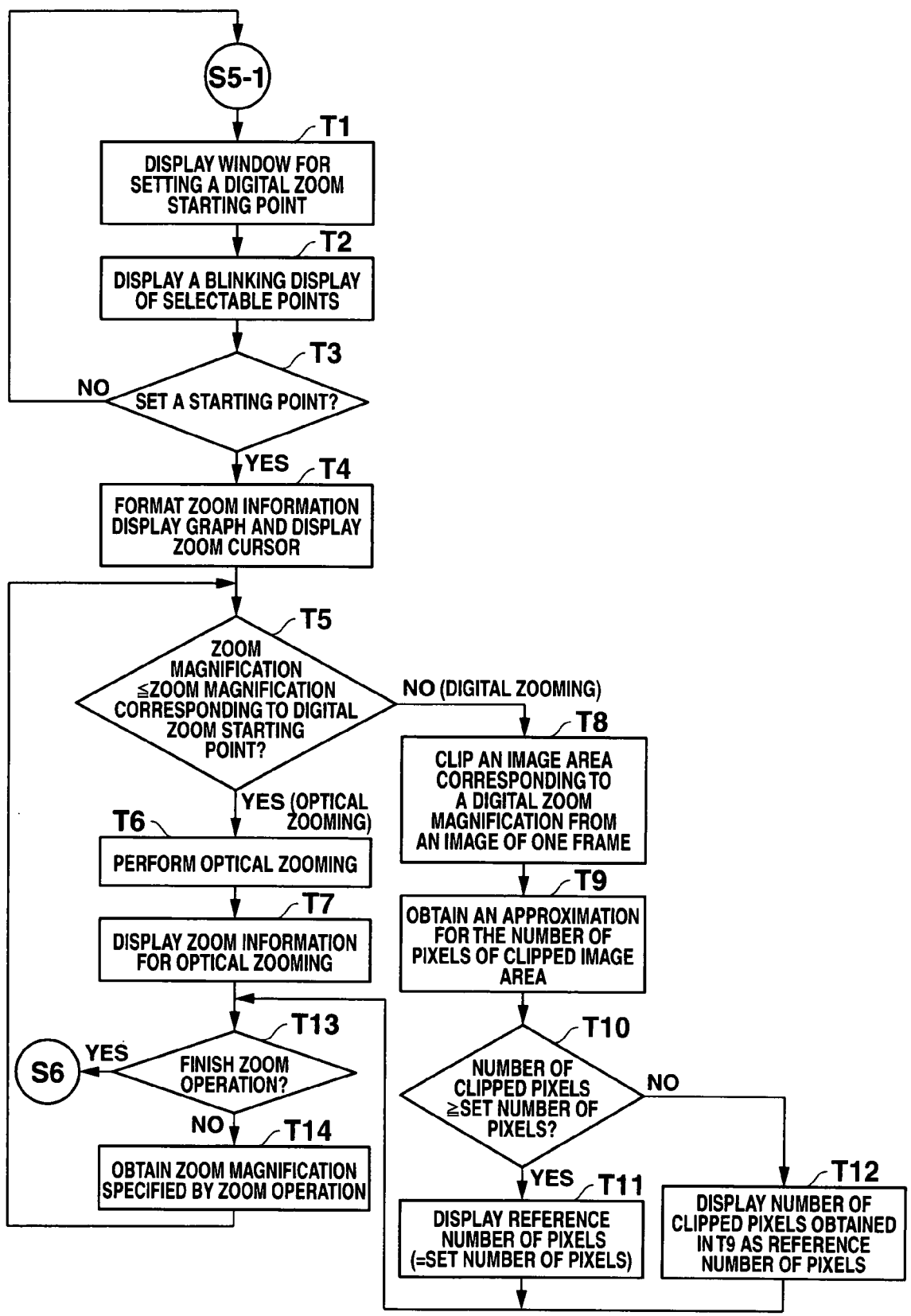
FIG. 11 is a flow chart showing variable digital zooming and the like in the second embodiment.

When the zoom button 7 is not manipulated in step S3, or when a transition of the flow occurs in step S5-11 of FIG. 6, or step T13 of FIG. 11, the system controller 35 checks a signal from the operating unit 41. If the first stroke (depressing half way) of the shutter key 8 has been performed, the system controller 35 advances the process to step S7, whereas if the shutter key 8 has not manipulated, the system controller 35 returns the process to step S3 (step S6).

When the first stroke of the shutter key 8 (depressing half way) is performed, the system controller 35 performs automatic focusing. In other words, the system controller 35 controls the image capturing unit 31 to move a focus lens so as to focus on a focus area, which is partitioned from the image area of a photogenic subject by a displayed automatic focusing frame, while performing aperture control. More specifically, the image capturing unit 31 sequentially moves the focus lens within a specified moving range at predetermined intervals. The system controller 35 calculates a focus evaluation value based on the image within the focus area for each moved position of the focus lens. The system controller 35 determines a position of the focus lens which allows the image of the photogenic subject in the focus area to be focused according to the obtained focus evaluation value, and moves the focus lens to the determined position. When automatic focusing is finished, the system controller 35 locks the focus lens at the focus position, and advances the process to step S8 (step S7). It should be noted that capturing images are displayed during focusing though not shown in the figures.

The system controller 35 checks a signal from the operating unit 41 to determine whether or not the second stroke of the shutter key 8 (depressing all the way) has been manipulated. When the shutter key 8 has been depressed all the way, the system controller advances the process to step S9 (step S8).

When the shutter key 8 has been depressed all the way, the system controller 35 immediately controls the image capturing unit 31 and the image data processing unit 32 to capture an image. In other words, the system controller 35 immediately blocks the signal route from the image data processing unit 32 to the temporary memory 36, and switches its operation to photographing, which differs from the acquisition of capturing images. Furthermore, the system controller 35 controls the recording unit 38 to take an image data and to perform an image compression for it. The system controller 35 controls the recording medium 39 to record an image file of the compressed data (step S9).

A. First Embodiment

FIG. 5 is a diagram illustrating an exemplary zoom information display according to the present invention, during optical and digital zooming when normal zooming is selected (see step S1 of FIG. 4). It should be noted that symbols "51" to "57" are common for FIGS. 5A to 5E and each exemplary embodiment of a bar for displaying zoom information described later. "51" represents a bar for displaying zoom information, "52" an optical zoom area, "53" a digital zoom area, "54" a cursor (zoom cursor), "55" a point set for maximum magnification of optical zooming (=telephoto end of optical zooming), "56" an area for displaying a reference number of pixels, and "57" an area for displaying a number of output pixels. A symbol "W" on the left side of the bar 51 indicates a wide end of the entire zoom area, and "T" on the right side indicates a telephoto end. A numerical value shown above the area 56 indicates a zoom magnification. When the zoom magnification includes a digital zoom magnification, a symbol "D" is shown on the right side of the zoom magnification as shown in FIGS. 5C, 5D and 5E, for example. Moreover, the zoom cursor 54 is shown at a specified position in the bar 51 (overlapping with the point 55, for example), and moved to the wide side or tele side by a predetermined distance in response to the zoom button 7 ("W" button 7-1 or "T" button 7-2) manipulated by a user.

Figure 5A:
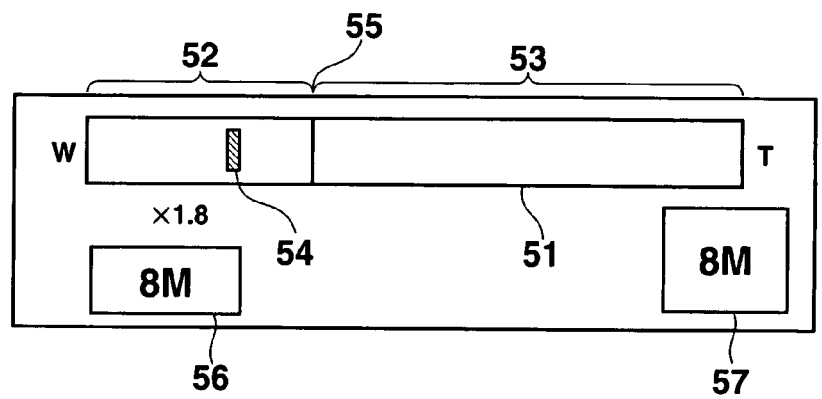
FIGS. 5A to 5E are diagrams each illustrating an exemplary display of zoom information during optical zooming.
Figure 5B:
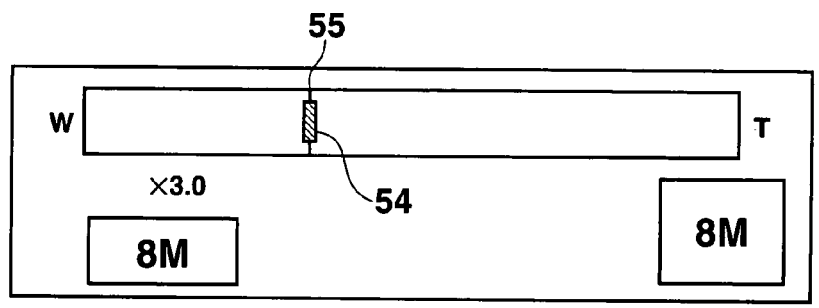
Figure 5C:
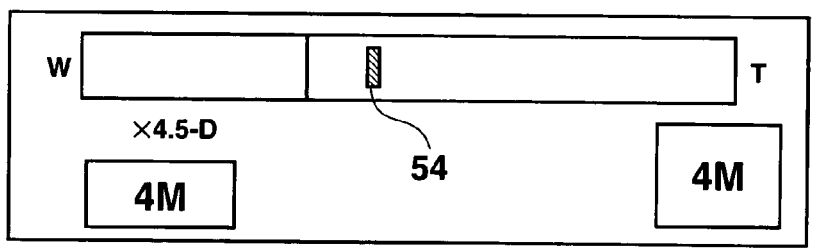
Figure 5D:
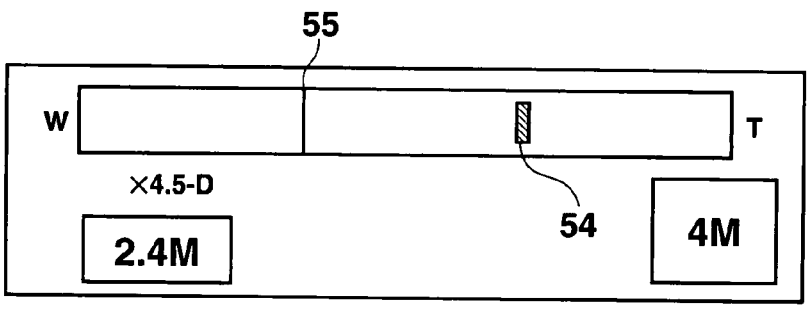
Figure 5E:
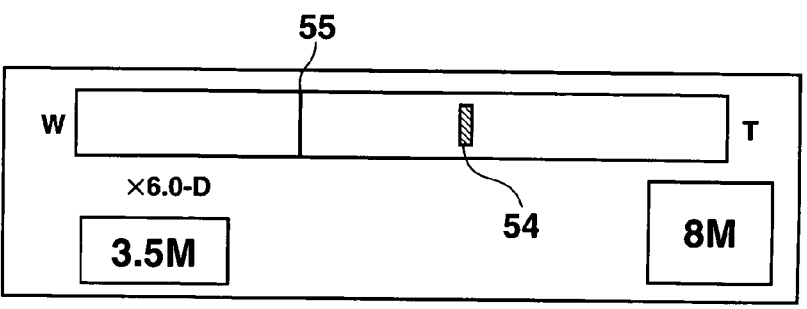

Suppose that the set number of pixels (number of output pixels that has been selected) is 8 M, and the maximum magnification of optical zooming is 3 during normal zooming, for example. When a zoom magnification set through manipulation of the cursor key 5 is less than 3 (e.g., 1.8), the zoom cursor 54 is displayed within the optical zoom area 52, and the zoom magnification "×1.8" is displayed above the area 56, as shown in FIG. 5A. When the zoom magnification is 3, the zoom cursor 54 is displayed overlapped with the point 55, and the zoom magnification "×3.0" is displayed, as shown in FIG. 5B. In addition, when the zoom magnification is more than 3, the zoom cursor 54 is displayed in the digital zoom area 53 according to the manipulation by the user, and the zoom magnification "×α-D" is displayed as shown in FIGS. 5C to 5E. For example, as shown in FIG. 5C, when the digital zoom magnification is 1.5, and the optical zoom magnification is 3, the zoom magnification results in 1.5×3=4.5, which is displayed as "×4.5-D".

During optical zooming, the distance between the receiving surface of the imaging element 31-5 and the lens varies, and the picture angles are actually changed. Since clipping is not performed, the degradation of image resolution does not occur, unlike digital zooming in which a clipped image is subjected to interpolation and enlargement. In this way, the number of pixels displayed in the area 56 is 8 M, which is the same as the set number of pixels displayed in the area 57 ("8 M" in this example), as shown in FIGS. 5A and 5B.

In digital zooming, on the other hand, the number of pixels displayed in the area 56 varies, as shown in FIGS. 5C to 5E, because clipping may be performed depending on a digital zoom magnification or a set number of pixels related to the number of pixels of the imaging element 31-5, as described in detail in FIG. 6.

FIG. 6 is a flow chart illustrating exemplary control actions performed by the system controller 35 for a zoom process and a display of zoom information. FIG. 6 describes a program for executing a zoom process and a display of zoom information according to the present invention for the digital camera 100. It also shows control actions for performing the zoom process and the zoom information display in step S5 of the flow chart as shown in FIG. 4.

In the following, a description is given of an example in which CPU of the system controller 35 operates in accordance with the program stored beforehand in a program memory. However, it is not necessary to store all functions in the program memory, as shown in the flow chart of FIG. 6. It may be alternatively possible that some or all parts of the program may be received through the network, for example. The following description is given with reference to FIGS. 1 to 6.

When a transition occurs in step S4 of FIG. 4, the system controller 35 determines whether or not the function for setting a digital zoom starting point has been established in the initial setting in step S1 of FIG. 4. When such a function has not been established, in other words, when normal zooming has been selected, the system controller 35 advances the process to step S5-2. In contrast, when the function has been established, the system controller 35 advances the process to variable digital zooming, as shown in FIG. 11, for example (step S5-1). A description in detail is given of variable digital zooming in a second embodiment.

In normal zooming, the system controller 35 starts controlling a display of zoom information. During the control, a format of the bar 51 for displaying zoom information, as shown in FIGS. 5A to 5E, for example, is displayed in a specified area of LCD 4. In addition, the zoom cursor 54 is displayed at a position corresponding to the zoom magnification obtained in step S4 of FIG. 4. Furthermore, the system controller 35 controls a display of the number of output pixels (set number of pixels) which has been set in the initial setting in step S1 of FIG. 4, in the area 57 for displaying a number of output pixels adjacent to the telephoto end of the bar 51, for example (step S5-2). It should be noted that the zoom cursor 54 is displayed at the position corresponding to the initialized zoom magnification resulting from optical and digital zooming as described above.

Next, the system controller 35 determines which zoom process to perform based on the zoom magnification obtained in step S4 of FIG. 4, or step S5-12 as described later. When the system controller 35 determines optical zooming, it advances the process to step S5-4. When the system controller 35 determines digital zooming, it advances the process to step S5-6. More specifically, when the zoom magnification calculated in response to zooming operation in step S3 of FIG. 4 is equal to or less than the maximum zoom magnification of optical zooming (default e.g., "3"), the system controller 35 advances the process to step S5-4. When the zoom magnification is greater than the maximum, the system controller 35 advances the process to step S5-6 (step S5-3).

When the zoom magnification is equal to or less than the maximum zoom magnification of optical zooming, the system controller 35 sends the zoom magnification obtained in step S4 of FIG. 4 or step S5-12 to the digital zoom processing unit 34. The system controller 35 sends a control signal to the zoom lens drive control module 31-1. Receiving the control signal, the zoom lens drive control module 31-1 moves the zoom lens (variable focal length lens) 1-1 to the wide (W) side or tele (T) side in accordance with the zoom magnification received by the optical zoom processing unit 33. In this way, the zoom lens drive control module 31-1 moves the zoom lens (variable focal length lens) 1-1 to a position corresponding to the zoom magnification (step S5-4).

The system controller 35 then sends a numerical value corresponding to the zoom magnification obtained in step S4 of FIG. 4, or step S5-12 to be described later, and the set number of pixels, to the image display unit 37. As shown in FIG. 5A, for example, the image display unit 37 displays the zoom magnification adjacent to the area 56 for displaying a reference number of pixels, as well as the set number of pixels in the area 57 for displaying a number of output pixels. Moreover, when optical zooming alone is performed, clipping of an image for adjusting a picture angle is not performed. In this case, the number of pixels does not generally fall below the set number of pixels. Accordingly, the system controller 35 determines the set number of pixels as a reference number of pixels, and controls the set number of pixels to be displayed in the area 56, advancing the process to step S5-11 (step S5-5).

When the zoom magnification is more than the maximum zoom magnification of optical zooming, the system controller 35 sends the zoom magnification obtained in the step S4 of FIG. 4, or the step S5-12 as described later, to the digital zoom processing unit 34. The digital zoom processing-unit 34 calculates a digital zoom magnification (=zoom magnification/maximum zoom magnification of optical zooming) from the received zoom magnification. The digital zoom processing unit 34 clips an image area according to the calculated digital zoom magnification from an image of one frame, which is outputted from the image data processing unit 32 and stored in the temporary memory 36. The unit 34 adjusts the number of pixels (by sub-sampling or interpolation) so as to meet the predetermined number of output pixels (set number of pixels), producing an enlarged image of the specified image area (step S5-6).

The system controller 35 obtains an approximation of the number of pixels (a number of clipped pixels) of the image area, which is clipped from the image of one frame according to the digital zoom magnification, from the digital zoom processing unit 34 (step S5-7), and compares the number of clipped pixels with the set number of pixels. When the number of clipped pixels is greater than the set number of pixels, the system controller 35 determines the set number of pixels as a reference number of pixels, and advances the process to step S5-9. On the other hand, when the number of clipped pixels is smaller than the set number of pixels, the system controller 35 determines the number of clipped pixels as a reference number of pixels, and advances the process to step S5-10 (step S5-8).

When the number of clipped pixels is greater than the set number of pixels, the digital zoom processing unit 34 performs sub-sampling for the clipped image area such that the number of pixels thereof is substantially equal to the set number of pixels. The system controller 35 then sends the zoom magnification, the reference number of pixels and the set number of pixels obtained in step S4 of FIG. 4, or step S5-12 as described later, to the image display unit 37. Subsequently, the system controller 35 displays the zoom magnification adjacent to the area 56 for displaying a reference number of pixels as shown in FIG. 5C, for example. In addition, the system controller 35 displays the set number of pixels in the area 56 as the reference number of pixels, and also the set number of pixels in the area 57 for displaying a number of output pixels, then advancing the process to step S5-11 (step S5-9). In the example of FIG. 5C, since the number of pixels in the clipped image area is greater than the set number of pixels, as shown in FIGS. 7A to 7C, the clipped image area undergoes sub-sampling such that the number of pixels thereof is equal to the set number of pixels. Furthermore, since the reference number of pixels is equal to the set number of pixels in spite of digital zooming, the same value is displayed in both areas 56 and 57. In this way, the zoom information described above indicates that no degradation occurs in each pixel data.

When the number of clipped pixels is smaller than the set number of pixels, the digital zoom processing unit 34 performs an interpolation for the clipped image so that the number of pixels thereof is substantially equal to the set number of pixels, thereby enlarging the clipped image. The system controller 35 sends the zoom magnification, the reference number of pixels, and the set number of pixels obtained in step S4 of FIG. 4, or step S5-12 as described later, to the image display unit 37. Subsequently, the system controller 35 displays the zoom magnification adjacent to the area 56 for displaying a reference number of pixels, as shown in FIGS. 5D and 5E, for example. In addition, the system controller 35 displays the number of clipped pixels obtained in step S5-7 in the area 56 as a reference number of pixels, and the set number of pixels in the area 57 for displaying a number of output pixels, then advancing the process to step S5-11 (step S5-10). In the example of FIG. 5D, the number of pixels in the clipped image area is smaller than the set number of pixels (less than the number of pixels in the receiving surface of the imaging element 31-5) as shown in FIGS. 8A to 8C. Accordingly, in the example of FIG. 5D and a similar example of FIG. 5E, an interpolation is performed for the clipped image area such that the number of pixels thereof is equal to the set number of pixels. In this way, the value displayed in the area 56 is smaller than that displayed in the area 57. The zoom information indicates that degradation occurs in each pixel data.

Next, the system controller 35 determines whether or not a predetermined time has passed after the zoom button 7 was released in step S4 of FIG. 4. When the predetermined time has passed, the system controller 35 determines that zooming is finished, and it advances the process to step S6 of FIG. 4. When the predetermined time has not passed, the system controller advances the process to step S5-12 (step S5-11). Alternatively, the system controller 35 can be configured so as to determine that zooming is finished when a predetermined key (e.g., SET button 6) is manipulated.

When zooming has not been finished, the system controller 35 returns the process to step S5-3 after calculating a zoom magnification in accordance with the number of times or the time period the zoom button 7 has been manipulated (step S5-12).

Since the reference number of pixels is displayed associated with the display of zoom information in response to the operation shown in the flow chart of FIG. 6, a user can obtain the information about an image resolution degraded by digital zooming during taking a photograph. A zoom state is shown by a position of the zoom cursor 54 in the bar 51 for displaying zoom information. Also, the zoom magnification (equal to zoom value), the set number of pixels and the reference number of pixels are displayed adjacent to the bar 51. In this way, the user can visually comprehend an approximate zoom magnification, as well as if optical zooming and digital zooming are in operation, through the position of the zoom cursor 54. In addition, the user can also know an exact zoom magnification by the numerical display. Furthermore, the user can visually understand that the number of pixels displayed in the area 57 and the approximated number of pixels displayed in the area 56 differ from each other (the reference number of pixels is smaller than the set number of pixels), or coincide with each other, depending on the position of the zoom cursor 54, namely the zoom magnification. Particularly in the case of digital zooming, the user can comprehend that the degradation of image resolution may or may not occur depending on a zoom magnification, and the resulting degree of degradation.

FIGS. 7A to 7C are explanatory diagrams of an example illustrating the sub-sampling of a clipped image area, under the assumption that the number of pixels of the imaging element 31-5 is 8 M, the set number of pixels is 4 M, and the number of pixels of clipped image area (number of clipped pixels) calculated from the zoom magnification is 5 M. A symbol "71" in FIG. 7 indicates an image of one frame (a number of pixels equal to 8 M) stored by the temporary memory 36. Symbols "72" and "73" indicate an image area (to be clipped) and a clipped image, each having the number of clipped pixels (5 M). A symbol "74" indicates an image with a size of the set number of pixels (number of output pixels).

When the image 71 of one frame (number of pixels equal to 8 M) stored by the temporary memory 36 in FIG. 7A is clipped according to the zoom magnification, the number of pixels of the clipped image 73 becomes 5 M, as shown in FIG. 7B, which indicates that the number of pixels of the clipped image 73 becomes greater than the set number of pixels (4 M). Accordingly, the set number of pixels is assigned to a reference number of pixels. The digital zoom processing unit 34 performs sub-sampling for the image 73 to be reduced to the image 74 having a size of the set number of pixels, as shown in FIG. 7C. The image 74 is recorded in the recording medium 39 via the recording unit 38.

FIGS. 8A to 8C are explanatory diagrams of an example illustrating the interpolation of a clipped image area, under the assumption that the number of pixels of the imaging element 31-5 is 8 M, the set number of pixels is 4 M, and the number of pixels of clipped image area (number of clipped pixels) calculated from the zoom magnification is 2.4 M. A symbol "81" in FIG. 8 indicates an image of one frame (a number of pixels equal to 8 M) stored by the temporary memory 36. Symbols "82" and "83" indicate an image area (to be clipped) and a clipped image, each corresponding to the number of clipped pixels (2.4 M). A symbol "84" indicates an image with a size of the set number of pixels (number of output pixels).

When the image 81 of one frame (number of pixels equal to 8 M) stored by the temporary memory 36 in FIG. 8A is clipped according to the zoom magnification, the number of pixels of the clipped image 83 becomes 2.4 M, as shown in FIG. 8B, which indicates that the number of pixels of the clipped image 83 becomes smaller than the set number of pixels (4 M). Accordingly, the number of clipped pixels is assigned to a reference number of pixels. The digital zoom processing unit 34 performs an interpolation for the image 83 to be enlarged to the image 84 having a size of the set number of pixels, as shown in FIG. 8C. The image 84 is recorded in the recording medium 39 via the recording unit 38.

As described above, the set number of pixels is displayed as an approximation in the area 56 for displaying a reference number of pixels, when the number of clipped pixels is greater than the set number of pixels. It may be alternatively possible to display the number of clipped images as an approximation in the area 56. In this case, the zoom information indicates that no degradation-occurs when the value displayed in the area 56 is greater than that displayed in the area 57 for displaying a number of output pixels.

B. Second Embodiment

Figure 9A:
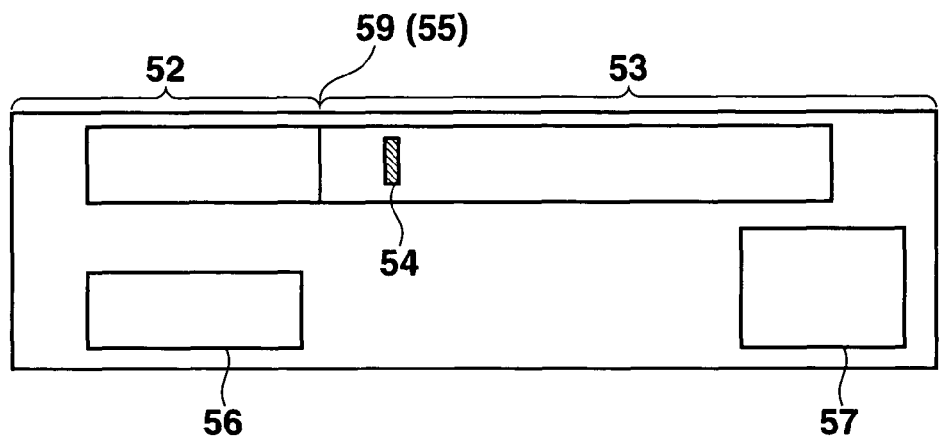
FIGS. 9A to 9C are diagrams each showing an example in which the starting position of digital zooming is variable within a movable range of optical zooming.
Figure 9B:
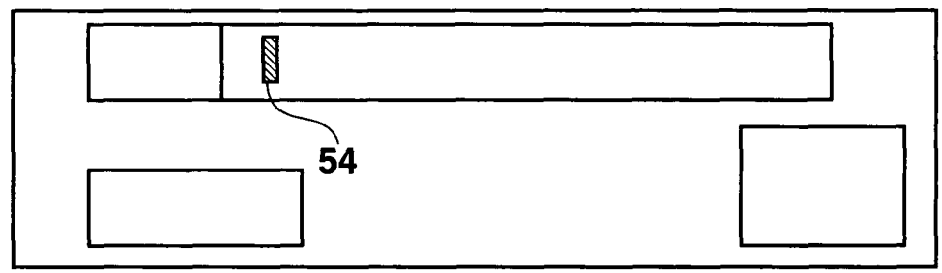
Figure 9C:
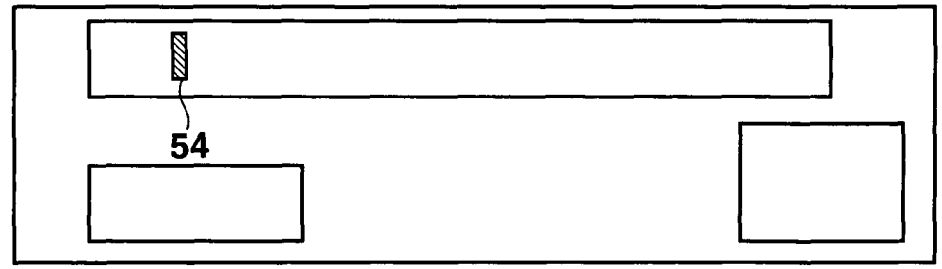

In the first embodiment, digital zooming begins from the point 55 set for maximum magnification of optical zooming (fixed point; telephoto end of optical zooming) as a starting point, which corresponds to the maximum zoom magnification of optical zooming (movable range of the zoom lens 1-1) set in advance at the shipment of the digital camera 100. In a second embodiment, multiple starting points of digital zooming are prepared in advance between wide and telephoto ends (the point 55) of optical zoom area 52 in addition to the point 55, as shown in FIGS. 9A to 9C, for example. This allows a user to select a starting point.

FIG. 9A is a schematic diagram illustrating an example in which a starting position 59 of digital zooming is placed at the point 55 (telephoto end of optical zooming) in a conventional manner. FIG. 9B is a schematic diagram illustrating another example in which the starting position 59 is placed between wide and telephoto ends of optical zooming. FIG. 9c is a schematic diagram illustrating still another example in which the starting position 59 is placed at the wide end of optical zooming. In the case of FIG. 9C, the digital zoom area covers the entire zoom area.

Figure 10:
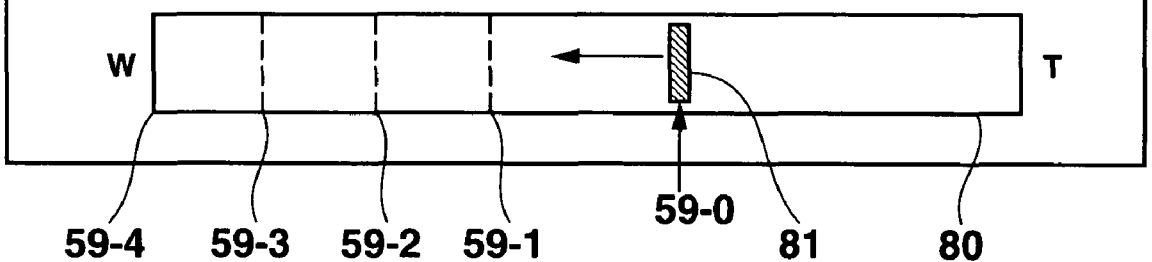
FIG. 10 is a diagram illustrating an example of a screen for setting a digital zoom starting point.

FIG. 10 is a schematic diagram illustrating an example of a screen for setting a digital zoom starting point. A symbol "80" indicates a bar for setting a digital zoom starting point, which is shaped substantially the same as the bar 51 for displaying zoom information. A symbol "81" indicates a movable block, and symbol "59-0" corresponds to the point 55 set for the maximum magnification of optical zooming which is the digital zoom starting point during normal zooming. In addition, symbols "59-1" to "59-4" indicate selectable zoom starting positions placed in advance between the point 55 and the wide end. A user can determine a digital zoom starting point by manipulating the cursor key 5 or the zoom button 7 so as to move the movable block 81 toward the wide end of optical zooming. When the user selects the position 59-4 (wide end), the digital zoom area covers the entire zoom area, as shown in FIG. 9c.

FIG. 11 is a flow chart illustrating an example of variable digital zooming. The flow chart corresponds to a process of variable digital zooming, which is executed when the function for setting a digital zoom starting point has been selected in step S5-1 of FIG. 6. For example, the flow may be configured with a subprogram (subroutine) that is attached to the program for displaying zoom information, as shown in FIG. 4. Compared with the flow of the first embodiment shown in FIG. 6, the flow of the second embodiment has additional steps T1 to T3, as shown in FIG. 11. However, except for these steps, steps T4 to T14 are basically the same as steps S5-2 to S5-12 in FIG. 6. For this reason, descriptions in detail are not given of the similar steps. A description is given of the flow chart with reference to FIGS. 4, 6, 9A to 9C, 10 and 11.

When the process moves from step 5-1 of FIG. 6 to step T1 of FIG. 11, the system controller 35 controls the image display unit 37 to display a window for setting a digital zoom starting point on LCD 4, including the bar 80 for setting a digital zoom starting point, as shown in FIG. 10. In addition, the system controller 35 invites a user to select a digital zoom starting point, with the point 55 representing the maximum magnification of optical zooming as an initial point 59-0 of the movable block 81 (step T1).

The system controller 35 checks how many times the zoom button 7 (W button 7-1) has been depressed based on signals coming from the operation unit 41, and moves the movable block 81 in a wide direction according to the number of times (or the time period) the W button 7-1 has been depressed. When the movable block 81 comes to rest at a selectable position for a digital zoom starting point, the system controller 35 waits for the manipulation by the user for setting the digital zoom starting point (e.g., depressing the SET key 6), while stopping the movable block 81 for a predetermined time (e.g., 2 seconds), and letting it blink (step T2).

The system controller 35 checks the signals from the operation unit 41, and advances the process to step T4, while maintaining the digital zoom starting point set by the user. On the other hand, when there is no manipulation, the system controller 35 returns the process to step S5-1 of FIG. 6 (step T3). In the example shown in FIG. 10, a plurality of selectable positions are provided between the point 55 set for the maximum magnification of optical zooming and the wide end. It may be alternatively possible to delete the pre-set selectable positions. In this case, the user moves the movable block 81 in a wide end direction of optical zooming by manipulating one of the cursor key 5 and the zoom button 7, and to arbitrarily determine a starting point for digital zooming by manipulating a key (e.g., SET key 6). Furthermore, it may be alternatively possible to adopt a table indicating zooming steps so as to allow the user to select, instead of displaying the bar 80 for setting a digital zoom starting point.

The system controller 35 controls LCD 4 to display a format for the bar 51 for displaying zoom information as shown in FIG. 9B (step T4).

In the first embodiment as described above, the system controller 35 executes step S5-3 and subsequent steps thereof based on the maximum magnification of optical zooming (see FIG. 6). In contrast, in the second embodiment, the system controller 35 executes step T5 and subsequent steps thereof, which correspond to step S5-3 and subsequent steps thereof, based on the optical zoom magnification defined at the starting position 59 of digital zooming. Since the process performed in each step after step T5 is basically the same as that of the first embodiment, descriptions in detail are omitted.

The process shown in the flow chart of FIG. 11 allows the user to freely set a digital zoom starting point between wide and telephoto ends of optical zooming. In this way, the user can arbitrarily select a photographing condition so as to obtain a desirable picture angle.

C. Exemplary Modification 1

In the flow chart shown in FIG. 11, a window for selection/setting, including the bar 80 for setting a digital zoom starting point as shown in FIG. 10, is displayed on LCD 4 in step T1 in order to invite a user to select a digital zoom starting point. When plural conditions exist for a picture angle during digital zooming, it may be possible to calculate optical and digital zoom conditions such that the user can selects one of optical and digital zooming.

Figure 12A:
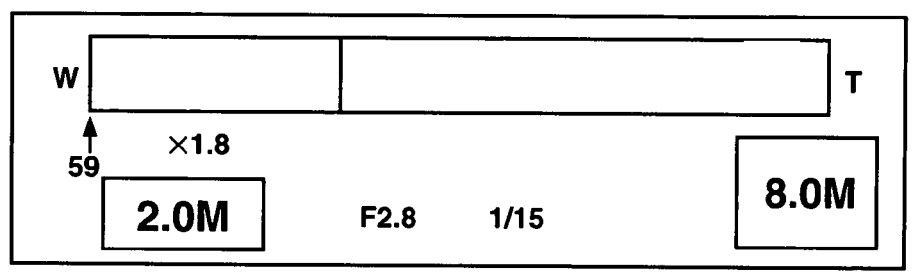
FIGS. 12A and 12B are diagrams each illustrating an exemplary screen for displaying a photographing condition during variable digital zooming.
Figure 12B:
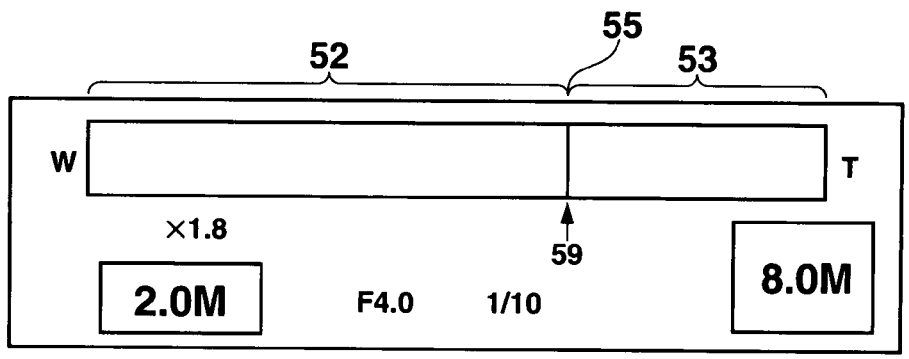

FIGS. 12A and 12B are schematic diagrams each illustrating an example of a photographing condition of digital zooming for the same picture angle. As shown in FIGS. 12A and 12B, photographing conditions differ according to digital zoom starting points. Also, these schematic diagrams each illustrate an exemplary screen for displaying a photographing condition during variable digital zooming.

FIG. 12A is an exemplary screen of digital zooming alone with a set number of pixels 8.0 M, a zoom magnification 1.8 and reference number of pixels 2.0 M (i.e., the digital zoom starting point is placed at the wide end position of optical zooming). An F-measure 2.8 and a shutter speed of $1/15$ are also displayed. Similarly, FIG. 12B is an exemplary screen where the digital zoom starting point is placed at the telephoto end position, with a set number of pixels 8.0 M, a zoom magnification 1.8 and a reference number of pixels 2.0 M. An F-measure of 4.0 and a shutter speed of $1/10$ are also displayed.

Figure 13:
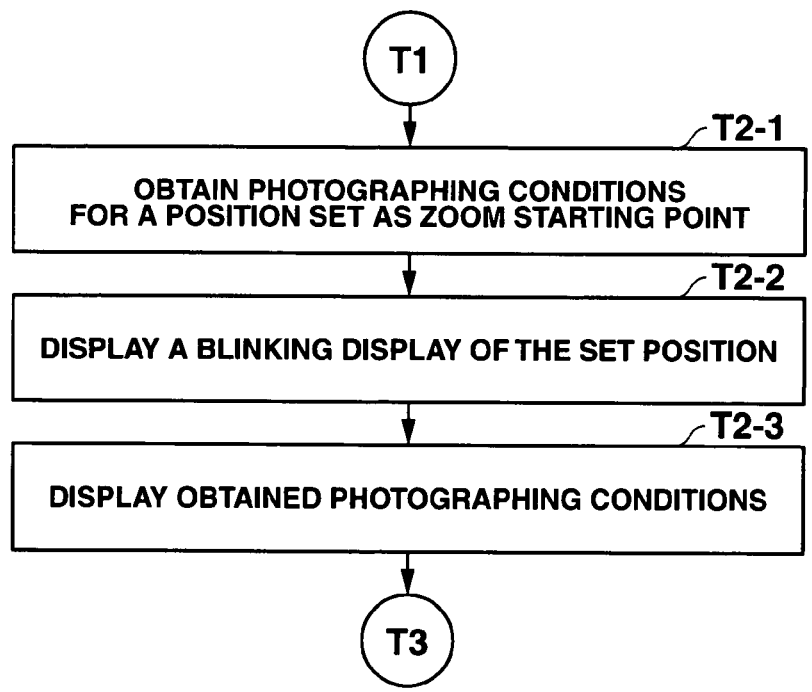
FIG. 13 is a flow chart illustrating variable digital zooming in Exemplary Modification 1 of the second embodiment.

FIG. 13 is a flow chart illustrating an example of variable digital zooming according to the Exemplary Modification 1. Compared with FIG. 11, steps T2-1 to T2-3 replace step T2. When the movable block 81 is positioned at a selectable position for a digital zoom starting point, a photographing condition is displayed. This allows the user to select a zoom starting point compatible with a desired photographing condition.

When the window for setting a digital zoom starting point is displayed in step T1 of FIG. 11, the system controller 35 checks how many times the zoom button 7 (W button 7-1) has been depressed based on signals from the operation unit 41, and moves the movable block 81 in a wide direction according to the number of times (or the time period) the W button 7-1 has been depressed. When the movable block 81 has come to a selectable position for a digital zoom starting point, the system controller 35 obtains (or calculates) a photographing condition for the selected position (e.g., F-measure and shutter speed) (step T2-1). The system controller 35 stops the movable block 81 for a predetermined period of time (e.g., 2 seconds), letting it blink (step T2-2). In addition, the system controller 35 displays the photographing condition obtained (or calculated) in step T2-1 under the bar 80 for setting a digital zoom starting point, for example, while waiting for the user to set a digital zoom starting point (depressing the SET 6, for example) (step T2-3). Examples of the method for obtaining photographing condition with respect to a selectable position for a digital zoom starting point include the following methods. According to one method, it may be possible to store a table that correlates a combination of picture angles and digital zoom magnifications with photographing conditions in a memory such as the recording medium 39, etc. in advance, and to calculate a picture angle based on a total number of pixels of the receiving surface of the imaging element 31-5, a set number of pixels, and a reference number of pixels. In this way, it may be possible to obtain a corresponding photographing condition for the picture angle from the table based on the current selectable position for a digital zoom starting point. According to another method, it may be possible to calculate a picture angle from a total number of pixels of the receiving surface of the imaging element 31-5, a set number of pixels, and a reference number of pixels, and to obtain a zoom magnification from a selectable position for a digital zoom starting point. In this way, it may be possible to calculate a photographing condition.

As described in the flow chart shown in FIG. 13, since the photographing condition is displayed every time the movable block 81 has come to the selectable position for a digital zoom starting point, the user can select a zoom starting point that allows a desirable photographing condition in step T3.

D. Exemplary Modification 2

Figure 14:
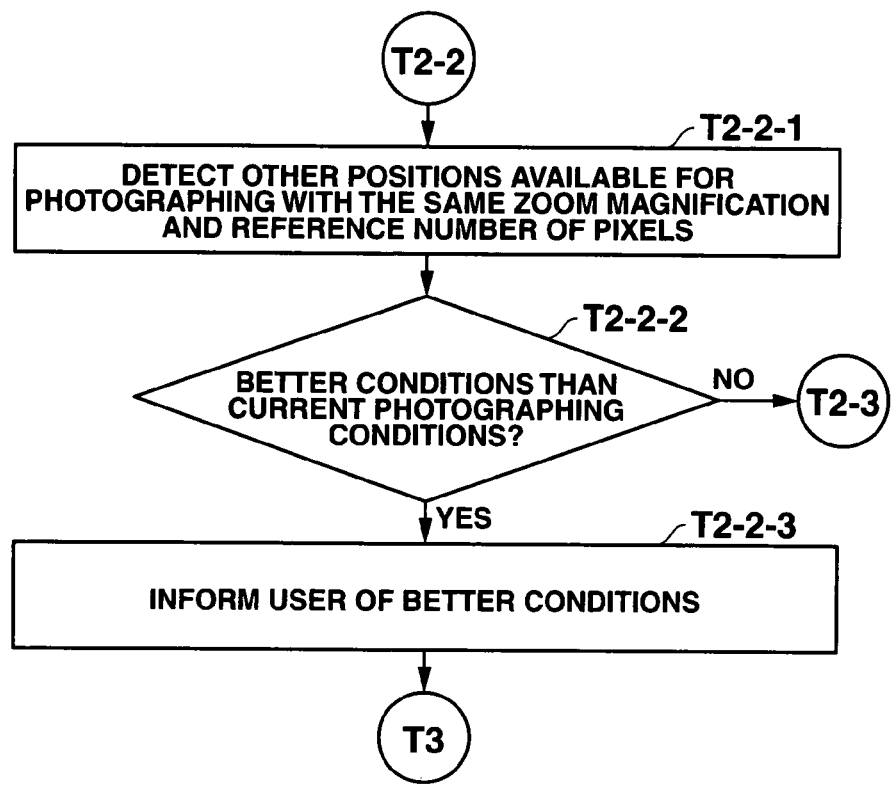
FIG. 14 is a flow chart illustrating an example of variable digital zooming in Exemplary Modification 2.
Figure 15A:
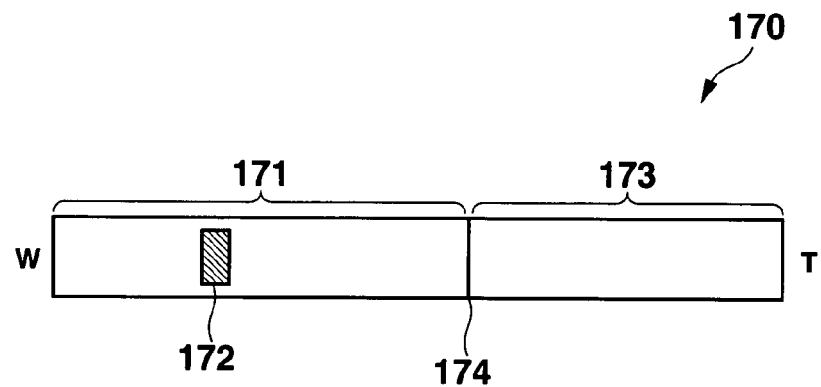
FIGS. 15A and 15B are diagrams each illustrating an example of a conventional zoom information display.
Figure 15B:
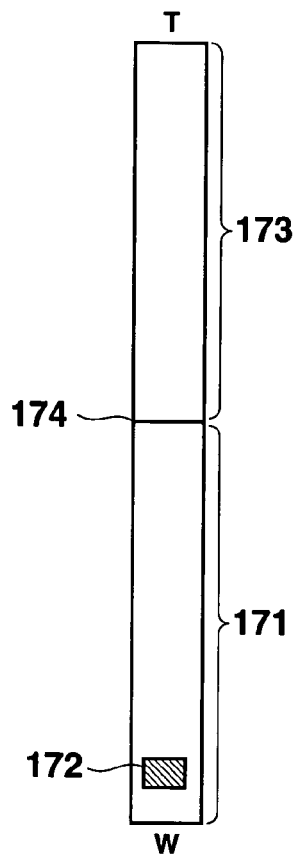

FIG. 14 is a flow chart illustrating an example of variable digital zoom operation of Exemplary Modification 2. As shown in FIG. 12, photographing conditions differ in apertures and shutter speeds depending on digital zoom starting positions, even if the zoom magnification and the reference number of pixels are the same. Taking into account this fact, it may be possible to prepare steps T2-2-1, T2-2-2, and T2-2-3 between steps T2-2 and T2-3. In step T2-2-1, the system controller 35 detects another selectable position for a digital zoom starting point having the same zoom magnification and reference number of pixels. In step T2-2-2, the system controller 35 detects whether or not there is a selectable position with a better photographing condition other than the position indicated by the movable block 81. In step T2-2-3, if there is a selectable position with a better photographing condition, the system controller 35 alerts the user to this position with a display and voice, and advances the process to step S3.

Figure 16A:
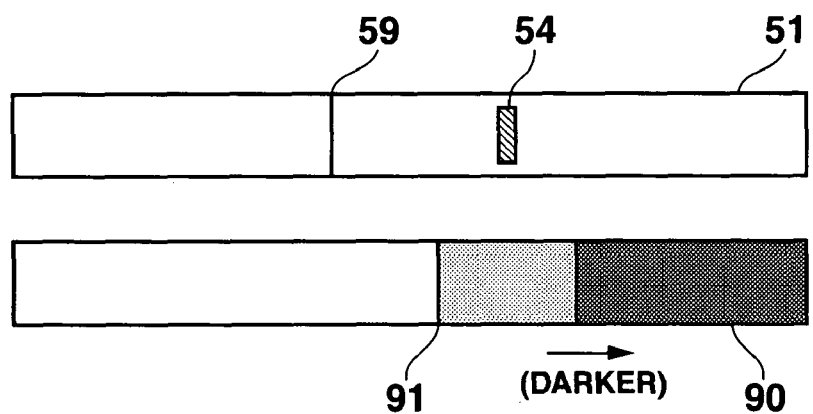
FIGS. 16A and 16B are diagrams each illustrating an example of a bar for displaying degradation.
Figure 16B:
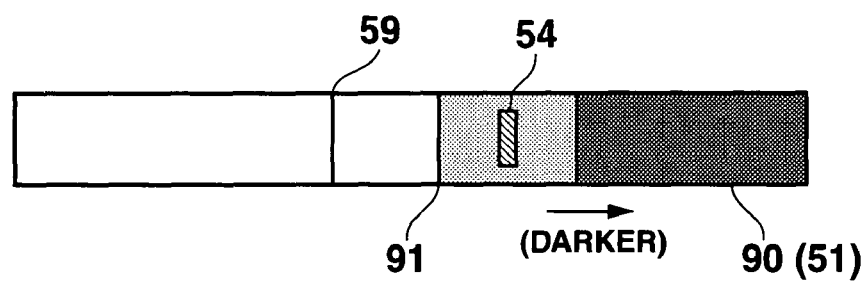

In the above embodiments, a description has been given of a configuration, in which the user can judge the degradation of pixel data (degradation of image resolution) of the image data finally outputted to the recording medium 39 based on a numerical display of the relationship between the reference number of pixels and the set number of pixels. However, the present invention is not restricted to such a numerical display. For example, it may be alternatively possible to adopt a bar with partitions indicating degrees of degradation. More specifically, the relationship between a zoom state and the degradation of image resolution is stored in a memory and the like in advance. Based on such a relationship, it may be possible to display a bar 90 for indicating degradation of resolution with different contrasts, in parallel with the bar 51 for displaying zoom information as shown in FIG. 16A, or overlapped with the bar 51 as shown in FIG. 16B. In this way, the user can easily comprehend the degradation of image resolution based on the positional relationship between the bar 51, the zoom cursor 54 (movable block) that is overlapped with the bar 51 and moves according to the zoom state, and the bar 90. It should be noted that the aforementioned relationship can be derived based on the reference number of pixels and the set number of pixels in each zoom state (optical zoom and digital zoom magnification), for example. Furthermore, it may be preferable, but not necessary that the above relationship be stored for each set number of pixels that is estimated in advance, and the bar 90 for displaying degradation be displayed in accordance with the set number of pixels selected by the user. In addition, in each example of FIGS. 16A and 16B, a darker area of the bar 90 indicates greater degradation of resolution. Moreover, it may be possible to overlap a line 91 with the bar 90 so as to indicate a boundary from which the degradation of resolution starts. It may be possible to adopt other alternatives, as long as they indicate the information of image resolution degraded by digital zooming during photographing.

While preferred embodiments of the present invention have been described and illustrated above, it is to be understood that they are exemplary of the invention and are not to be considered to be limiting. Additions, omissions, substitutions, and other modifications can be made thereto without departing from the spirit or scope of the present invention.

What is claimed is:

1. An imaging apparatus comprising:
   an image capturing unit;
   an imaging lens;
   a moving unit that moves the imaging lens;
   a digital zoom starting point setting unit that presets a digital zoom starting point in a movable range of the imaging lens between a tele side and a wide side of an optical zooming;
   an adjusting unit that adjusts a clipped area for an image to be captured by the image capturing unit;
   a position setting unit that causes the moving unit to move the imaging lens to a given position between the tele side and the wide side of the optical zooming when the adjusting unit starts to adjust the clipped area, wherein the given position corresponds to the preset digital zoom starting point;
   a display unit that displays, at a first location, a first number of pixels of the clipped area adjusted by the adjusting unit;
   a storage unit;
   a setting unit that presets a second number of pixels of an image to be recorded in the storage unit;
   a judging unit that judges whether or not the first number of pixels is larger than the second number of pixels; and
   a display controller that controls the display unit to display the second number of pixels at the first location in place of the first number of pixels when the judging unit judges that the first number of pixels is larger than the second number of pixels,
   wherein a display operation based on the display unit, the judging unit and the display controller is performed before capture of the image to be captured by the image capturing unit.

2. The imaging apparatus according to claim 1, further comprising:
   an acquiring unit that acquires a photographing condition of the imaging apparatus corresponding to the given position of the imaging lens when the adjusting unit starts to adjust the clipped area;
   wherein the display controller further controls the display unit to display the acquired photographing condition in addition to a zoom magnification corresponding to the clipped area before the capture of the image to be captured by the image capturing unit.

3. The imaging apparatus according to claim 1, wherein the display controller further controls the display unit to display a zoom magnification corresponding to the clipped area adjusted by the adjusting unit before the capture of the image to be captured by the image capturing unit.

4. The imaging apparatus according to claim 1, wherein the display unit displays the second number of pixels at a second location that is different from the first location, regardless of a result of the judging by the judging unit.

5. A method for determining a position of an imaging lens in an imaging apparatus which includes a moving unit for moving the imaging lens, and a storage unit for recording an image, the method comprising:
   presetting a digital zoom starting point in a movable range of the imaging lens between a tele side and a wide side of an optical zooming;
   adjusting a clipped area for an image to be captured;
   causing the moving unit to move the imaging lens to a given position between the tele side and the wide side of the optical zooming when the adjustment of the clipped area is started, wherein the given position corresponds to the preset digital zoom starting point;

displaying, at a first location, a first number of pixels of the clipped area, wherein a second number of pixels of the image to be recorded in the storage unit have been preset;

judging whether or not the first number of pixels is larger than the second number of pixels; and displaying the second number of pixels at the first location in place of the first number of pixels when it is judged that the first number of pixels is larger than the second number of pixels, wherein a display operation based on: (i) the display of the first number of pixels, (ii) the judgment of whether or not the first number of pixels is larger than the second number of pixels, and (iii) the display of the second number of pixels when it is judged that the first number of pixels is larger than the second number of pixels, is performed before capture of said image to be captured.

6. The method according to claim 5, further comprising displaying the second number of pixels at a second location that is different from the first location, regardless of a result of the judging.

* * * * *